(12) United States Patent
Funaoka et al.

(10) Patent No.: US 8,416,827 B2
(45) Date of Patent: Apr. 9, 2013

(54) GAS LASER OSCILLATOR

(75) Inventors: Kouji Funaoka, Chiyoda-ku (JP);
Masahiko Hasegawa, Chiyoda-ku (JP);
Kazuo Sugihara, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 0 days.

(21) Appl. No.: 13/144,515

(22) PCT Filed: May 19, 2009

(86) PCT No.: PCT/JP2009/059211
§ 371 (c)(1),
(2), (4) Date: Jul. 14, 2011

(87) PCT Pub. No.: WO2010/134166
PCT Pub. Date: Nov. 25, 2010

(65) Prior Publication Data
US 2011/0274132 A1 Nov. 10, 2011

(51) Int. Cl.
*H01S 3/22* (2006.01)
(52) U.S. Cl.
USPC ............ 372/57; 372/55; 372/58; 372/62; 372/65
(58) Field of Classification Search .......... 372/55, 372/57, 58, 62
See application file for complete search history.

(56) References Cited

U.S. PATENT DOCUMENTS

| | | | | |
|---|---|---|---|---|
| 3,361,989 A | * | 1/1968 | Sirons | 372/72 |
| 6,882,674 B2 | * | 4/2005 | Wittak et al. | 372/58 |
| 2003/0107283 A1 | * | 6/2003 | Suzuki et al. | 310/90.5 |

FOREIGN PATENT DOCUMENTS

| | | |
|---|---|---|
| JP | 60-254680 A | 12/1985 |
| JP | 6-035484 Y2 | 9/1994 |
| JP | 7-038177 A | 2/1995 |
| JP | 10-256624 A | 9/1998 |
| JP | 2002-176220 A | 6/2002 |
| JP | 2007-294807 A | 11/2007 |

OTHER PUBLICATIONS

International Search Report (PCT/ISA/210) issued on Jun. 16, 2009, by Japanese Patent Office as the International Searching Authority for International Application No. PCT/JP2009/059211.
Written Opinion (PCT/ISA/237) issued on Jun. 16, 2009, by Japanese Patent Office as the International Searching Authority for International Application No. PCT/JP2009/059211.

* cited by examiner

*Primary Examiner* — Dung Nguyen
(74) *Attorney, Agent, or Firm* — Buchanan Ingersoll & Rooney PC

(57) ABSTRACT

An oscillator housing includes a main body unit that is shaped into a frame and formed of a metallic material and a cover unit that is formed of a metallic material to cover openings of the main body unit, and has an outer wall that has an arc cross section perpendicular to the optical axis and extends in the optical axis direction and side walls that are connected to the both ends of the outer wall in the optical axis direction. When the cover unit is fixed to the main body unit with a fixing member, the outer wall having an arc shape is configured such that force is generated in the height direction towards the outside of the oscillator housing on the connecting portion of the cover unit with the main body unit.

7 Claims, 7 Drawing Sheets

GAS LASER OSCILLATOR

FIELD

The present invention relates to a gas laser oscillator that performs laser oscillation with laser mediating gas sealed in an oscillator housing that has a hermetically sealed structure.

BACKGROUND

A conventional orthogonal excitation gas laser oscillator has an oscillator housing of a hermetically sealed structure in which laser mediating gas such as $CO_2$ gas is sealed, and is provided in the oscillator housing with discharge electrodes for discharging and exciting the laser mediating gas, heat exchangers for cooling the laser mediating gas, and a fan for circulating the laser mediating gas. Moreover, a mirror optical system that configures a gas laser oscillator resonator is provided in the two sides of the oscillator housing. In the continuous oscillation of gas laser such as $CO_2$ gas laser, discharge excitation, in which excitation occurs by electron collision at the time of discharging, is generally used to excite (pump) gas molecules that emit laser light to an energy level required for induction and discharge. In such a situation, to ensure stable discharging, the inside of the oscillator housing needs to be kept under vacuum of 30 to 60 Torr, which means that the oscillator housing of the gas laser oscillator needs to have a tight sealing property that can keep the vacuum state.

Furthermore, because regular maintenance needs to be performed for the discharge electrodes, the heat exchangers, the fan, the mirror optical system, and the like that are arranged inside the oscillator housing, it is preferable that these are easily accessible for a maintenance person from the outside of the oscillator housing. For this reason, in general, a large opening is provided in the oscillator housing, and a removable cover unit is arranged to cover this opening.

Because of the above, the cover unit of the gas laser oscillator preferred to be designed to sustain a load applied when the inside of the oscillator housing is brought to a vacuum state, to have an air tight property to maintain the vacuum state, and also to keep an opening whose area is large enough to facilitate the maintenance for the inside components of the oscillator housing. In addition, the laser oscillator, which is used mainly for laser processing, has been developed to produce higher power so that the processing capacity can be improved. For this reason, long discharge electrodes, large heat exchangers, and large gas ducts are introduced, and as a result, the housing becomes longer especially in the optical axis direction and its height and width are also increased. Moreover, because a larger atmospheric pressure is exerted thereon due to the surface area that is increased in accordance with the upsizing, greater strength and rigidity are required for the housing and the cover unit against it.

Hence, according to the conventional technology, in a laser oscillator that includes a rectangular-solid housing in which structural devices of a gas laser oscillator such as discharge electrodes and mirrors, ribs and opening supporting components arranged in the housing to prevent the housing from being deformed, and a cover unit arranged to cover the opening of the housing, a structure in which a curved surface expanding toward either inside or outside of the housing is formed in the cover unit has been suggested (see, for example, Patent Literature 1).

CITATION LIST

Patent Literature

Patent Literature 1: Japanese Patent Application Laid-open No. 2007-294807

SUMMARY

Technical Problem

However, the structure of the housing is a rectangular solid in the laser oscillator described in Patent Literature 1, and therefore bending stress is exerted on the top and bottom surfaces of the housing due to atmospheric pressure as the laser oscillator is upsized. Then, the top and bottom surfaces of the housing are sunk around the center thereof, and a large bending stress is thereby produced. For this reason, the plate units for the top and bottom surfaces of the housing need to be thickened, and reinforcing ribs are also required, as mentioned above. This results in a problem of the increased production cost of the laser oscillator.

The present invention has been made in light of the above. Its purpose is to obtain, as a high-power gas laser oscillator that requires a large and heavy pressure container, a gas laser oscillator that can realize significant weight reduction and also production cost reduction, in comparison with the conventional technology.

Solution to Problem

A gas laser oscillator according to an aspect of the present invention includes an oscillator housing formed of a metallic material; a pair of optical bases arranged on two sides of the oscillator housing, connected in parallel by at least three support poles extending in an optical axis direction, and each supporting optical components that form an optical resonator; and a pair of bellows and resilient members that connect the pair of optical bases to the oscillator housing, wherein: in a case in which an optical axis direction of the optical resonator is X-axis, a height direction perpendicular to the optical axis direction is Z-axis, and a direction perpendicular to the X-axis and the Z-axis is Y-axis, the oscillator housing includes: a main body unit that is formed of a metallic material, shaped into a frame, and has a pair of side panels arranged and spaced apart in the X-axis direction and a top panel and a bottom panel that extend in the X-axis direction to connect the side panels at top ends and bottom ends thereof in the Z-axis direction; and a cover unit that is formed of a metallic material to cover openings of the main body unit, has an arc cross section perpendicular to the X-axis, and includes an outer wall extending in the X-axis direction and side walls connected to both ends of the outer wall in the X-axis direction, and the outer wall is configured to have an arc shape so that force is generated in the Z-axis direction toward outside of the oscillator housing on a connecting portion of the cover unit with the main body unit when the cover unit is fixed to the main body unit with a fixing member.

Advantageous Effects of Invention

According to the present invention, an arc-shaped exterior wall is formed so that, when the cover unit is fixed to the main body with a fixing member, a force is generated in the Z-axis direction toward the outside of the oscillator housing on the connecting portion of the cover unit to the main body. Thus, when atmospheric pressure is exerted on the oscillator housing, a force acts onto the top panel and the bottom panel from the cover unit to push the top panel and bottom panel against the high pressure. As a result, the bending stress that appears in the top panel and the bottom panel is reduced, and the thickness of the top and bottom panels of the oscillator housing can be reduced. Hence, weight reduction and a low cost can be realized.

BRIEF DESCRIPTION OF DRAWINGS

FIG. 5-1 is a diagram showing the oscillator housing in the Z-X plane.

FIG. 5-2 is a cross sectional view of FIG. 5-1 taken along B-B.

FIG. 6-1 is a diagram of the oscillator housing in the Z-X plane.

FIG. 6-2 is a cross sectional view of FIG. 6-1 taken along C-C.

DESCRIPTION OF EMBODIMENTS

Exemplary embodiments of the gas laser oscillator according to the present invention are explained in detail below with reference to the attached drawings. The present invention is not limited to these embodiments.

First Embodiment

Figure 1:
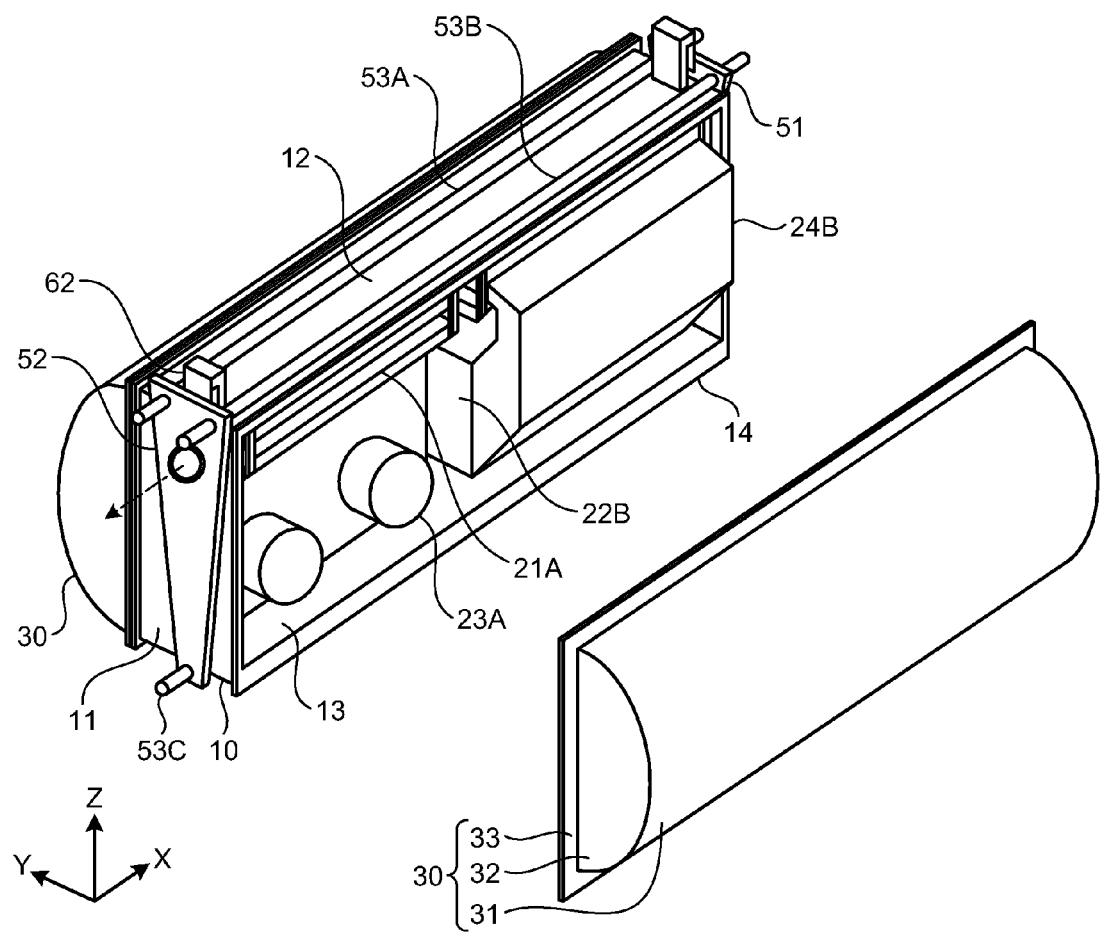
FIG. 1 is a perspective view showing an example structure of a gas laser oscillator according to the first embodiment of the present invention with one of the cover units taken off.
Figure 2:
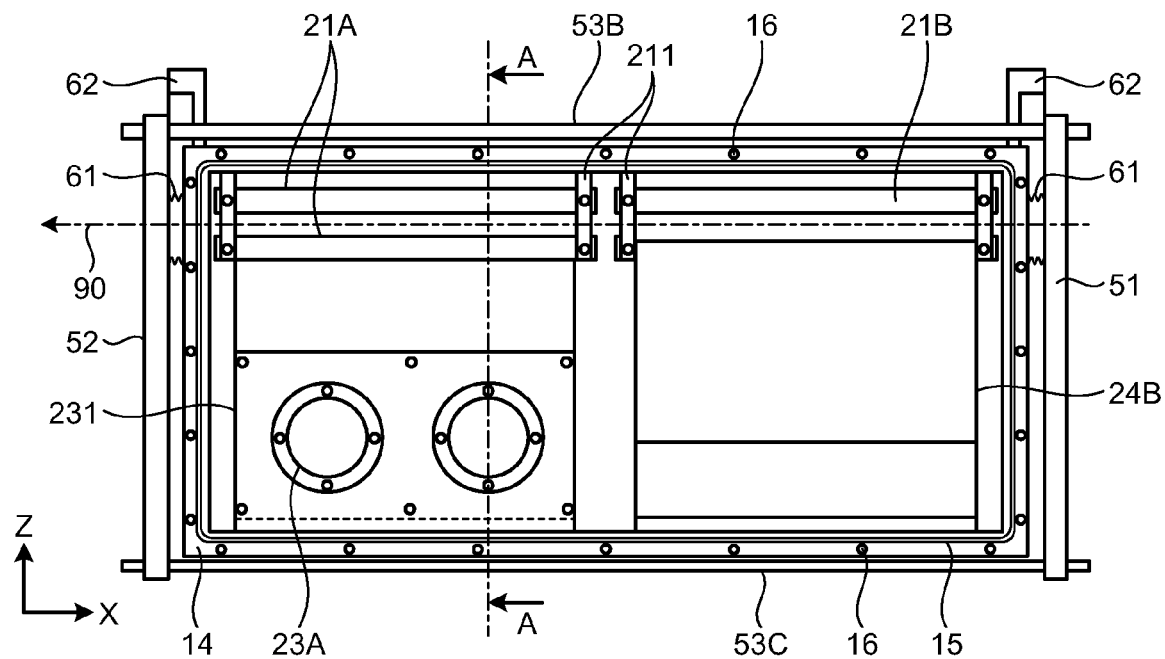
FIG. 2 is a side view of the gas laser oscillator of FIG. 1 with the cover taken off.
Figure 3:
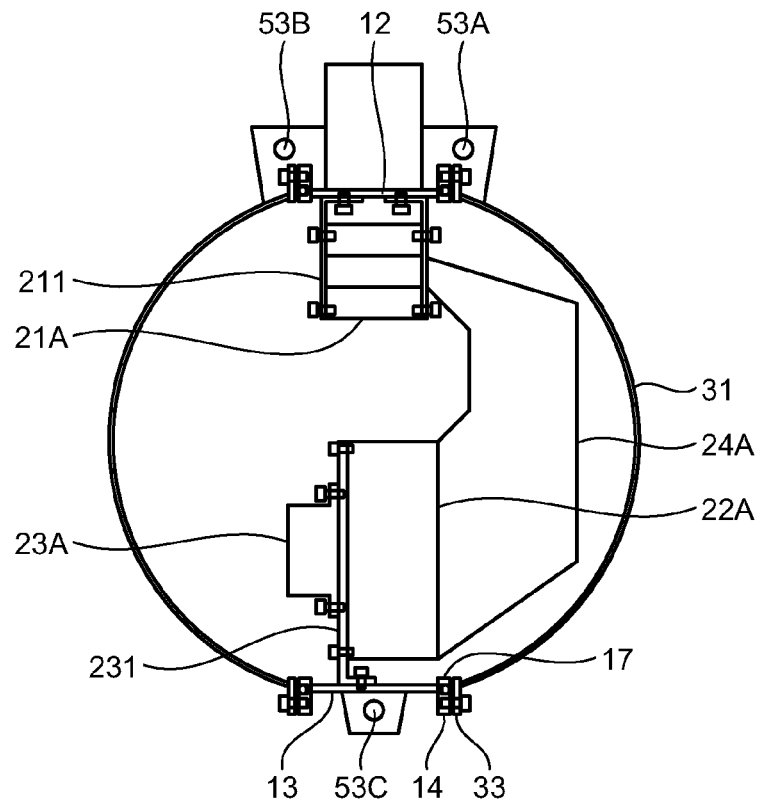
FIG. 3 is a cross sectional view of FIG. 2 taken along arrows A-A.
Figure 4:
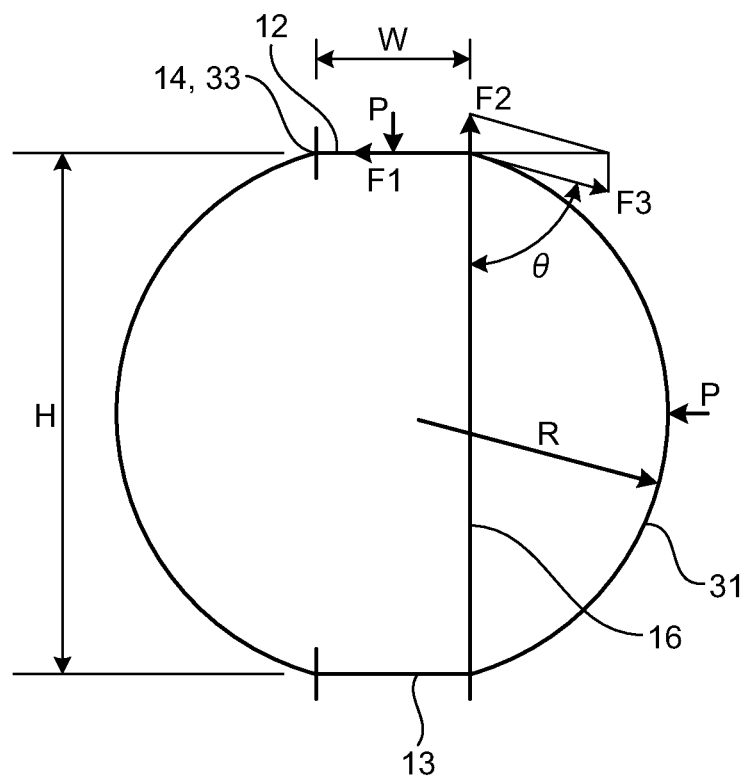
FIG. 4 is a schematic diagram showing the forces exerted on the oscillator housing of the gas laser oscillator.
Figures 1, 5:
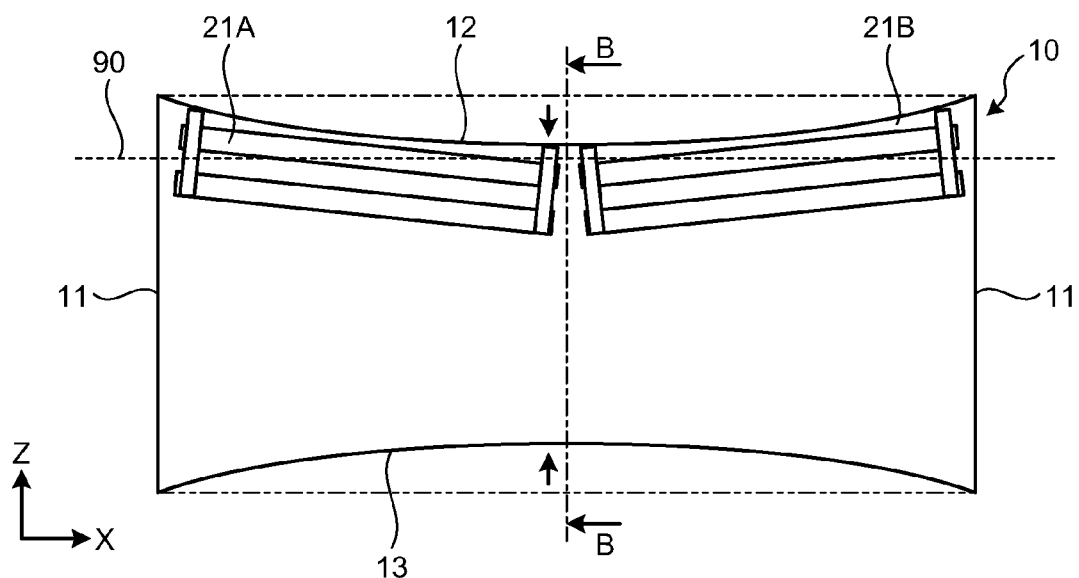
Figures 2, 5:
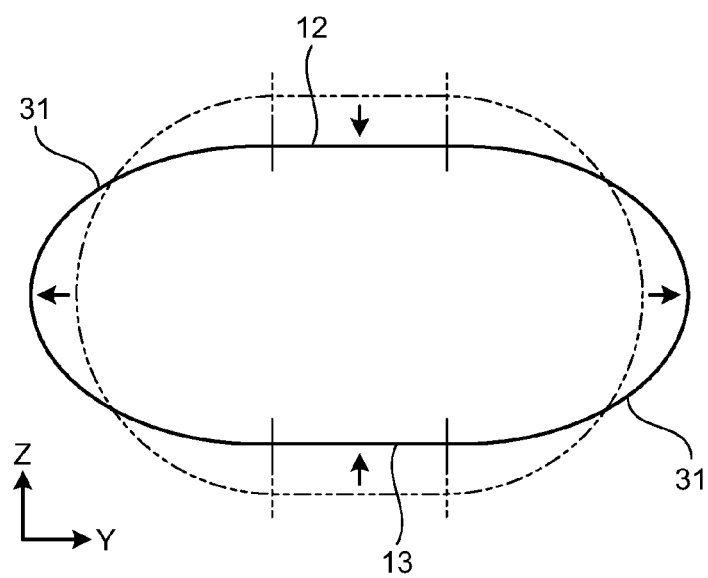
Figures 1, 6:
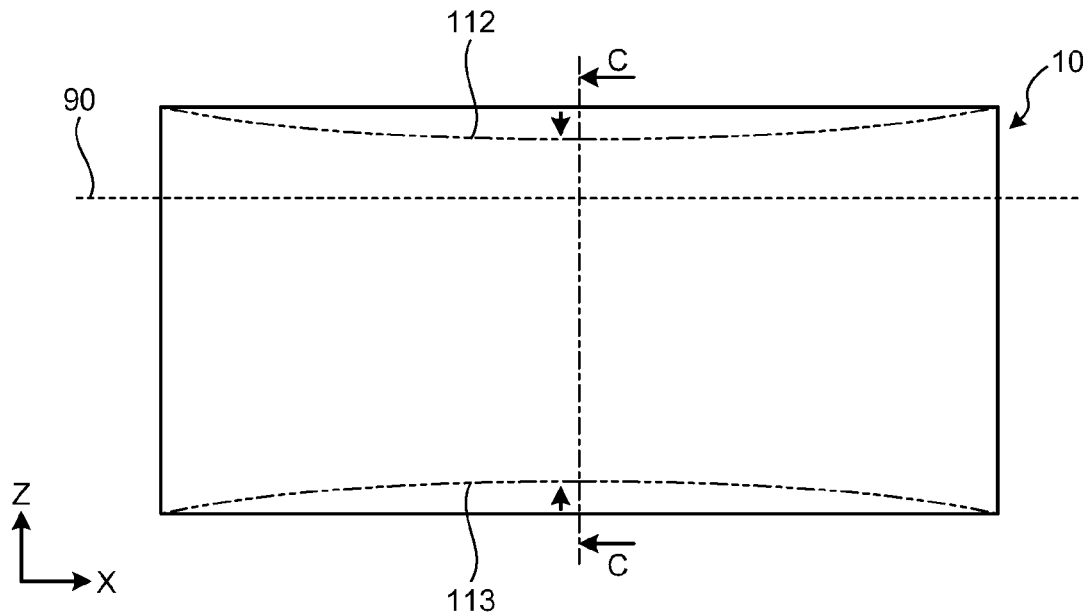
Figures 2, 6:
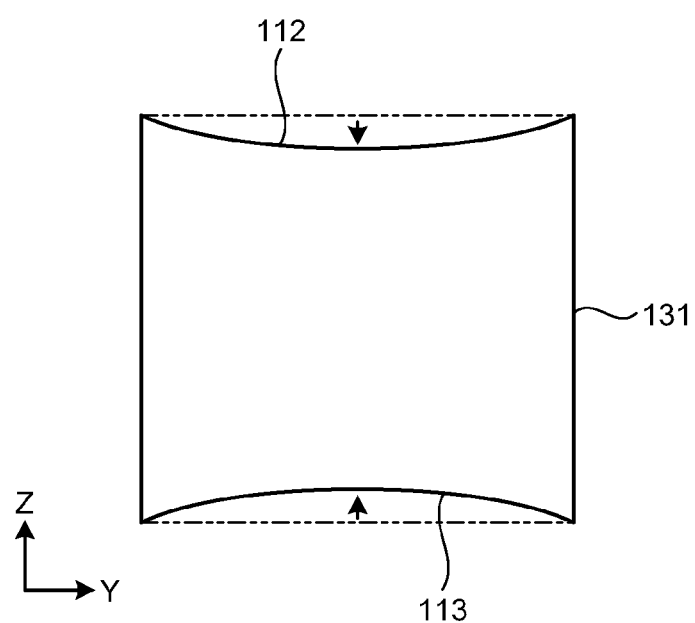

FIG. 1 is a perspective view showing an example structure of a gas laser oscillator according to the first embodiment of the present invention with one of the cover units taken off, FIG. 2 is a side view of the gas laser oscillator of FIG. 1 with the cover taken off, and FIG. 3 is a cross sectional view of FIG. 2 taken along arrows A-A. Further, FIG. 4 is a schematic diagram showing the forces exerted on the oscillator housing of the gas laser oscillator. In addition, FIGS. 5-1 and 5-2 are schematic diagrams showing deformation caused by pressure that acts on the oscillator housing when the cross section of the cover is shaped into an arc, where FIG. 5-1 is a diagram showing the oscillator housing in the Z-X plane, and FIG. 5-2 is a cross sectional view of FIG. 5-1 taken along B-B showing the oscillator housing in the Y-Z plane. Furthermore, FIGS. 6-1 and 6-2 are schematic diagrams showing deformation caused by pressure that acts onto the oscillator housing when the oscillator housing is a rectangular solid, where FIG. 6-1 is a diagram of the oscillator housing in the Z-X plane, and FIG. 6-2 is a cross sectional view of the oscillator housing of FIG. 6-1 taken along C-C, in the Y-Z plane. In the following explanation, the optical axis direction of the laser light is referred to as the X-axis, the height direction perpendicular to this optical axis is referred to as the Z-axis, and the direction perpendicular to both X-axis and Z-axis is referred to as the Y-axis.

In the oscillator housing, a main body 10 that has a frame-like structure and cover units 30 that cover the openings in the two sides of the frame structure are fixed to one another with fixing members such as nuts and bolts so as to form a hermetically sealed structure.

The main body 10 includes a frame-like member in which a pair of side panels 11 having a width W and extending in the Z-axis direction; a frame-like member in which a top panel 12 and a bottom panel 13 having the width W, extending in the X-axis direction, and connecting the upper ends of the side panels 11 to each other and the lower ends thereof to each other are formed into a frame; and flange panels 14 arranged at the two ends of this frame-like member in the Y-axis direction. An O-ring groove 15, and through holes 16 used to fasten the main body 10 and the cover units 30 that are arranged outside the O-ring groove 15 with bolts are formed in the flange panel 14. Such a main body 10 is prepared by hermetically welding the top panel 12, the bottom panel 13, the side panels 11, and the flange panel 14 that are made of metal materials such as steel, stainless steel, and aluminum.

Discharge electrodes 21A and 21B for laser light emission, heat exchangers 22A and 22B for cooling laser mediating gas, fans 23A for circulating the laser mediating gas, gas ducts 24A and 24B that form paths between the discharge electrodes 21A and 21B and the fans 23A to circulate the laser mediating gas, and the like are provided in the main body 10. Here, the side portions of the discharge electrodes 21A and 21B are fixed to the top panel 12 by an electrode mounting board 211, and the end portions of the fans 23A in the Y-axis direction are fixed to the bottom panel 13 by a blower mounting panel 231. Furthermore, the heat exchanger 22A and the gas duct 24A are fixed between the discharge electrode 21A and the fans 23A.

Moreover, in this example, the discharge electrodes 21A and 21B, the heat exchangers 22A and 22B, the fans 23A, and the gas ducts 24A and 24B are arranged in pair. More specifically, the discharge electrodes 21A and 21B that have approximately half the length of the main body 10 in the X-axis direction are arranged in the X-axis direction, and a heat exchanger, a fan, and a gas duct are provided for each of these discharge electrodes 21A and 21B. Here, the fans are arranged such that their air blowing directions are opposite to each other.

On the two sides of the main body 10 in an optical axis 90, a rear optical base 51 retaining a total reflection mirror and a front optical base 52 retaining a partial reflection mirror on the same optical axis as that of the total reflection mirror are arranged in parallel to each other by use of three support poles 53A to 53C in total, one below the outside of the main body 10 and two above. Then, the rear optical base 51 retaining the total reflection mirror and the front optical base 52 retaining the partial reflection mirror form an optical resonator.

The optical bases 51 and 52 are connected to the side panels 11 of the main body 10 by bellows 61, and laser light penetrates through these bellows 61. Moreover, the optical bases 51 and 52 are fixed to the side panels 11 of the main body 10 via resilient members 62 such as plate springs.

The cover unit 30 includes an outer wall 31 that has an arc-shaped cross section in a direction perpendicular to the X-axis and extends in the X-axis direction, side walls 32 connected to the two ends of the this outer wall 31 in the Z-axis direction, and a flange panel 33 connected to the main body 10 with O-rings. In the flange panel 33, through holes (not shown) are formed to fasten the main body 10 arranged outside the O-ring groove and the cover unit 30 with fixing members such as bolts. These bolt-fastening through holes are provided with the same pitches as that of the bolt-fastening through holes 16 provided in the flange panel 14 of the main body 10. The cover unit 30 is prepared by hermetically welding the outer wall 31 formed of a metal material such as aluminum, stainless steel, and steel and subjected to a bending process, to the flange panel 33 and the side walls 32 formed of a metal material such as aluminum, stainless steel, and steel. In principle, no bending stress is caused onto the arc-shaped portion of the outer wall 31 under atmospheric pressure, and thus the cover unit can be considerably thinned in comparison with a flat cover.

O-rings are arranged in the O-ring groove 15 of the flange panel 14 of the main body 10 having the above structure, and after the flange panel 14 of the main body 10 and the flange panel 33 of the cover unit 30 are aligned such that the positions of the bolt-fastening through holes coincide with each other, bolts are inserted into the bolt-fastening through holes and fixed with nuts. An oscillator housing having the main body 10 and the cover unit 30, with which air-tightness is ensured, can be thereby obtained. Such an oscillator housing forms a pressure-proof container. In addition, the optical bases 51 and 52 are mounted on the oscillator housing, and thus a gas laser oscillator can be realized.

As illustrated in FIG. 3, the oscillator housing with the cover unit 30 mounted has a cross section perpendicular to the X-axis direction that is shaped into arc portions for the outer walls of the cover units 30 continued to linear portions for the top panel 12 and the bottom panel 13 of the main body 10. When maintenance is performed, fastening members such as nuts and bolts are removed so that the main body 10 and the cover unit 30 can be open.

Next, the relationship between the curvature radius R of the cover unit 30 and its height H in the Z-axis direction is explained with reference to FIG. 4. It is shown here that the width of the main body 10 (the length in the Y-axis direction) is W, the atmospheric pressure is P, the chord length of the outer wall 31 (cover unit 30) (the height of the outer wall 31 in the Z-axis direction) is H, the force in the direction of compressing the top panel 12 is F1, the force in the direction of pushing the top panel 12 up (the direction of the chord of the arc) is F2, the force of compressing the outer wall 31 (the force in the direction of the tangent line to the arc end portion) is F3, the angle formed by the tangent line of the arc end portion and the chord of the arc is θ, and the curvature radius of the arc of the outer wall 31 is R.

First, the following equations (1) to (4) are obtained in accordance with the principle of action and reaction on the flange panels 14 and 33 under an atmospheric pressure P.

$$P \cdot H = 2 \cdot F1 \tag{1}$$

$$F3 \cdot \sin\theta = F1 \tag{2}$$

$$F3 \cdot \cos\theta = F2 \tag{3}$$

$$R \cdot \sin\theta = H/2 \tag{4}$$

The situation of the cross section of the outer wall 31 (cover unit 30) being semicircular, or in other words, R=H/2, is considered here. In this situation, because θ is 90°, the force F2 of pushing the top panel 12 up is 0 according to equation (3). Then, the top panel 12 and the bottom panel 13 yield inwardly due to the atmospheric pressure, as illustrated in FIGS. 5-1 and 5-2, and thus a large bending stress cannot be prevented from acting onto the Y-Z section surfaces of the top panel 12 and the bottom panel 13. In addition, the oscillator housing is pressed down in the Z-axis direction due to the pressure exerted onto the top panel 12 and the bottom panel 13, and deformed in an elongated manner in the Y-axis direction. In FIGS. 5-1 and 5-2, the dashed-double dotted lines indicate the position of the outline of the oscillator housing when the inside of the oscillator housing is also under atmospheric pressure.

According to the first embodiment, the cover unit 30 is configured to satisfy the following equation (5).

$$R > H/2 \tag{5}$$

In other words, by determining θ to be smaller than 90° according to equations (4) and (5), the force F2 of pushing the top panel 12 and the bottom panel 13 outwardly (toward the high-pressure side) can be generated in the top panel 12 and the bottom panel 13 according to equation (3), and thus the bending stress generated on the Y-Z sections of the top panel 12 and the bottom panel 13 can be reduced. As a result, the strength of the top panel 12 and the bottom panel 13 can be reduced, and the thickness of the top panel 12 and the bottom panel 13 can be reduced. In addition, as the thickness of the panels is reduced, the leg of the welding unit is shortened, which reduces the welding process and increases the welding speed. Hence, the welding reliability is further improved.

It is preferable that θ be smaller than 90°. Ideally, it is preferable that the atmospheric pressure P on the top panel 12 (the same for the bottom panel 13) and the force F2 of the cover unit 30 pushing the top panel 12 up are in balance. Thus, the condition of bringing the atmospheric pressure P on the top panel 12 (bottom panel 13) and the force F2 of the cover unit 30 pushing the top panel 12 up into balance can be expressed in the following equation (6).

$$P \cdot W = 2 \cdot F2 \tag{6}$$

By eliminating F1, F2, F3, and θ by use of equations (1) to (4) and (6), the following equation (7) can be obtained, and the curvature radius R is preferable to be selected to satisfy this equation (7).

$$R = H/(2 \cdot \sin(\arctan(H/W))) \tag{7}$$

As shown above, by determining the curvature radius R of the cover unit 30 to satisfy the equation (5) or (7), no bending stress is generated on the Y-Z section surfaces of the top panel 12 and the bottom panel 13. As a result, the thickness of the top panel 12 and the bottom panel 13 can be considerably reduced. Because the bending stress generated on the Y-Z section surface is proportional to the square of the length of the main body 10 in the direction of the optical axis 90, it is particularly effective for the main body 10 of a high-output gas laser oscillator that extends considerably in the direction of the optical axis 90.

Next, the bending stress exerted on the sections X-Z of the top panel 12 and the bottom panel 13 of the main body 10 under atmospheric pressure is explained. Because this stress is proportional to the square of the width W of the main body 10, it is better to have a small width. However, as shown in FIGS. 6-1 and 6-2, when the oscillator housing 100 is shaped into a box (see, for example, Japanese Patent Application Laid-open No. 60-254680), the top panel 112 and the bottom panel 113 need to have a large width. For this reason, a large bending stress is exerted onto the top panel 112 and the bottom panel 113, deforming the oscillator housing 100. To prevent this from occurring, as disclosed in Japanese Patent Application Laid-open No. 2007-294807, it is necessary to arrange plural reinforcing ribs on the top panel 112 and the bottom panel 113 at regular intervals in the X direction.

On the other hand, when the cover unit 30 has a section perpendicular to the X-axis direction that is shaped into an arc according to the first embodiment, the cover unit 30 bulges out in the Y-axis direction most at the center of the height direction. This can reduce the width W of the top panel 12 and the bottom panel 13, in comparison with the oscillator housing having a box-shaped structure. The structure can eliminate the reinforcing ribs that are required in the conventional technology, and the welding and assembling costs can be reduced.

According to the first embodiment, the cover unit 30 having an arc shape that satisfies the equation (5) or (7) is fixed to the side surface of the main body 10. Thus, when the atmospheric pressure is received by the oscillator housing in the Z-axis direction, the Z-axis-direction components of the reaction to the force that tightens the flange act in the direction of cancelling the atmospheric pressure. As a result, no bending stress appears in the Y-Z sections of the top panel 12 and the bottom panel 13 of the main body 10, and thus the thickness of the top panel 12 and the bottom panel 13 can be advantageously reduced. Moreover, because the width W of the top panel 12 and the bottom panel 13 of the main body 10 can be reduced in comparison with the conventional oscillator housing having a box-shaped structure, resistance to the bending stress acting on the X-Z section due to the atmospheric pressure can be developed, eliminating the need for reinforcing members. In addition, because in principle no bending stress appears in the arc portion of the cover unit 30 under atmospheric pressure, the cover unit 30 can be considerably thinned in comparison with a flat cover.

Second Embodiment

Figure 7:
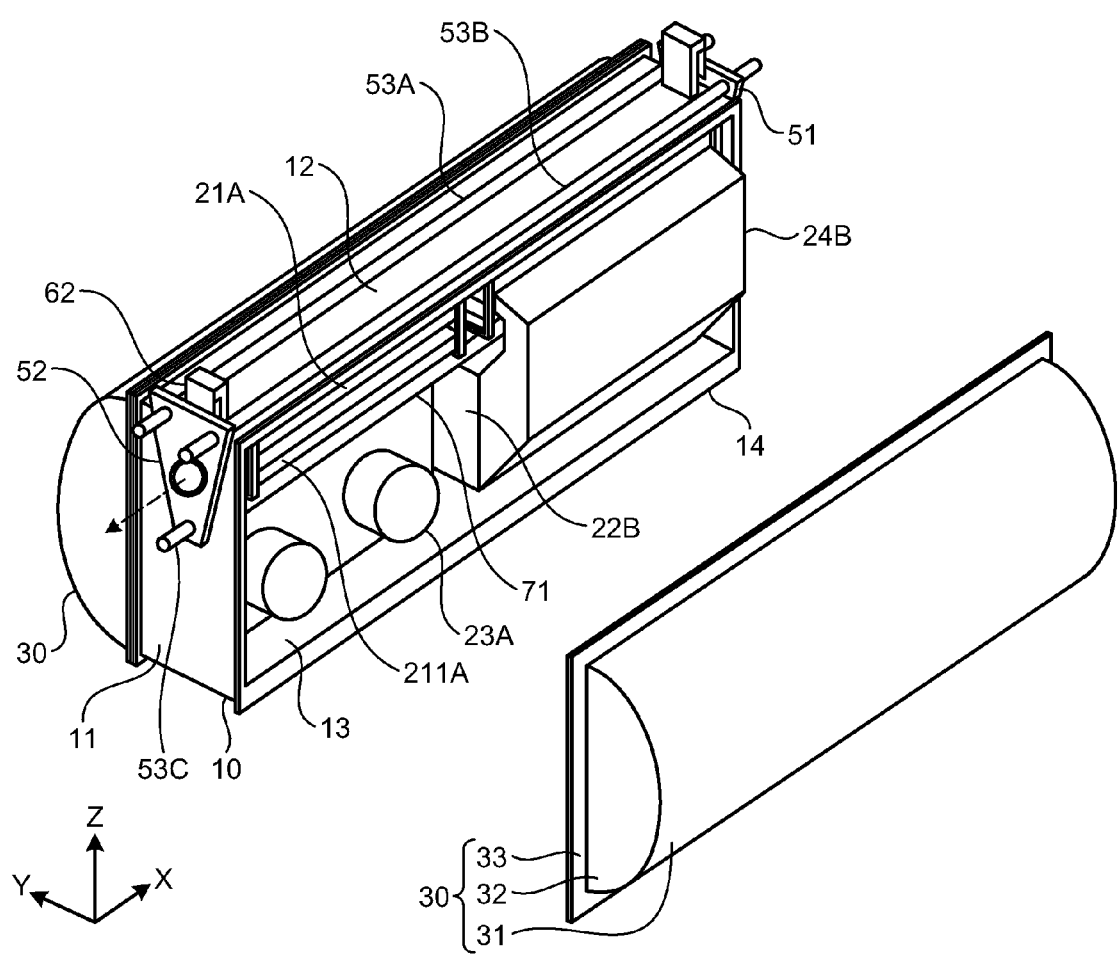
FIG. 7 is a perspective view showing an example structure of a gas laser oscillator according to a second embodiment of the present invention with one of the cover units taken off.
Figure 8:
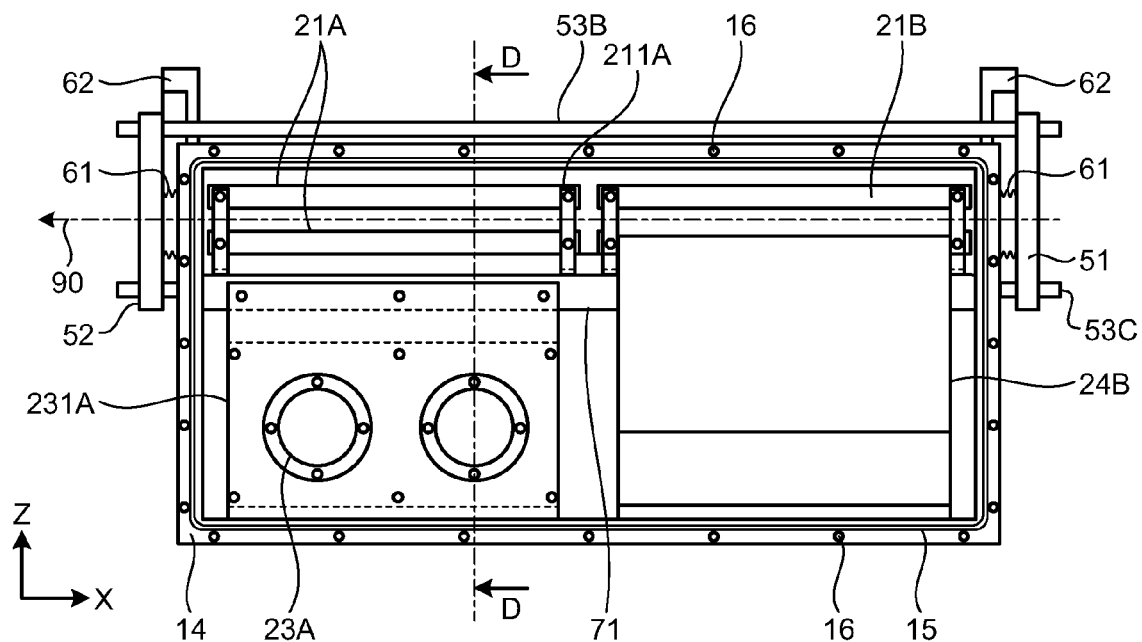
FIG. 8 is a side view of the gas laser oscillator of FIG. 7 with the cover taken off.
Figure 9:
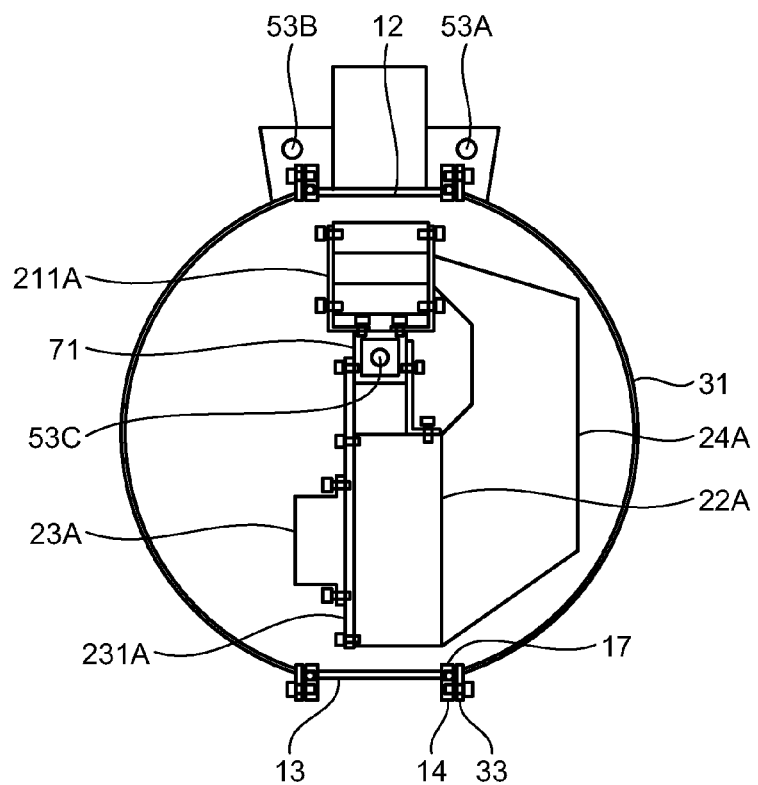
FIG. 9 is a cross sectional view of FIG. 8 taken along arrows D-D.

FIG. 7 is a perspective view showing an example structure of a gas laser oscillator according to the second embodiment of the present invention, with one of the cover units taken off, FIG. 8 is a side view of the gas laser oscillator of FIG. 7, with the cover taken off, and FIG. 9 is a cross sectional section of FIG. 8 taken along arrows D-D. The structural components that are the same as those of the first embodiment are given the same reference numerals, and the explanation thereof is omitted here.

According to the second embodiment, the support pole 53 arranged underneath the outside of the main body 10 in the gas laser oscillator of the first embodiment is arranged to penetrate the pair of side panels 11 of the main body 10. For this reason, a structural member 71 is arranged in the vicinity of the lower support pole 53 to couple the pair of side panels 11 to each other. As a structural member 71, a structure with a cross section that has high bending rigidity, such as C steel and H steel, is preferable. However, in the example of the drawing, square steel having a rectangular section and a tubular structure (hollow structure) is adopted so that the lower support pole can be inserted into the hollow portion without touching the surrounding portion. The structural member 71 is welded around the center of the side panels 11, and arranged so as to be kept from contact with the top panel 12, the bottom panel 13, and the cover unit 30.

Furthermore, according to the second embodiment, the discharge electrodes 21A and 21B are positioned by an electrode mounting board 211A and fixed to the structural member 71. In addition, the fans 23A and 23B, the heat exchanger 22A, and the gas ducts 24A and 24B for connecting the discharge electrodes 21A and 21B to the fan 23A are fixed to the structural member 71 that runs in the vicinity of the center of the main body 10. The fan 23A, the heat exchanger 22A, and the gas ducts 24A and 24B are arranged so as to be kept from contact with the top panel 12, the bottom panel 13, and the cover unit 30.

In the main body 10, not shown screw holes need to be formed to fix components such as cooling water piping, electric wiring for the fans 23A and 23B, and a desiccating agent. According to the second embodiment, all the screw holes for fixing these components may be formed in the structural member 71 that couples the side panel 11 to the side panel 11 so that no component needs to be fixed to the top panel 12, the bottom panel 13, or the cover unit 30 of the main body 10, or that no screw hole needs to be formed therein.

In addition, the structure may be such that two support poles are inserted into the main body 10 and another support pole is provided outside the main body 10. However, in such a structure, the two support poles inserted into the main body 10 would interfere with the cover unit 30, preventing the width of the main body 10 from being reduced. For this reason, as mentioned above, two support poles 53A and 53B out of the three support poles 53A to 53C that connect the optical bases 51 and 52 to each other may be arranged to run outside the main body 10, while only the support pole 53 may be arranged to run inside the square steel (column steel) 27 in the main body 10 so that interference between the support pole 53 and the cover unit 30 can be avoided and the width W of the main body 10 can be reduced.

According to the second embodiment, the structural member 71 is arranged inside the main body 10 to couple the side panels 11 to each other, and the discharge electrodes 21A and 21B are mounted on this structural member 71. With such a structure, even if the main body 10 and the cover are deformed under atmospheric pressure, the positions of the discharge electrodes 21A and 21B would not be changed with reference to the optical axis 90, and thus the thickness of the top panel 12 and the bottom panel 13 can be further reduced. In addition, allowance for discharge gap has been conventionally designed in consideration of displacement of the discharge electrodes 21A and 21B that may occur in accordance with the deformation of the main body 10 and the cover unit, but this can be reduced. As a result, because the amount of loss of excited gas that escapes without being used for laser oscillation (stimulated emission) can be reduced, the laser oscillation efficiency can be improved.

Moreover, because heavy components such as fans, heat exchangers, and gas ducts that connect these components, as well as components that require high assembly precision, are not arranged in the top panel 12 and the bottom panel 13 of the main body 10 or the cover, the thickness of the components that form the top panel 12, the bottom panel 13, and the cover can be reduced. At the same time, the welding and assembling dimensional accuracy can be eased when producing the main body 10 and the cover, while the cost reduction can be realized.

Furthermore, screw holes are formed only in the side panels 11 and the structural member 71 to fix the components that are to be mounted on the gas laser oscillator so that no machining process is required for the top panel 12 and the bottom panel 13 of the main body 10. In addition, because there are no screw holes, a constraint of the minimum thickness defined by the breakage strength of a screw thread is eliminated, and the thickness of the components can be reduced to the pressure withstanding limit.

In the above explanation, two discharge electrodes 21A and 21B are arranged in the main body 10 in such a manner that the orientation of the fan and the heat exchanger attached to the discharge electrode 21A is opposite to the orientation of the fan and the heat exchanger attached to the other discharge electrode 21B so that the gas flows in opposite directions. Alternatively, even when the orientations of the fans and the heat exchangers attached to the discharge electrodes 21A and 21B are designed to be the same so that the gas would not flow in opposite directions, the same effects can still be achieved.

INDUSTRIAL APPLICABILITY

As shown above, the gas laser oscillator according to the present invention is effective when laser is oscillated in the oscillator housing that has a hermetically sealed structure. It is suitable especially for a high-power gas laser oscillator that is long in the optical direction.

REFERENCE SIGNS LIST

10 MAIN BODY
11 SIDE PANELS
12 TOP PANEL
13 BOTTOM PANEL
14, 33 FLANGE PANEL
15 O-RING GROOVE
16 THROUGH HOLES
21A, 21B DISCHARGE ELECTRODES
22A, 22B HEAT EXCHANGERS
23A, 23B FANS
24A, 24B GAS DUCTS
30 COVER UNIT
31 OUTSIDE WALL
32 SIDE WALL
33 FLANGE PANEL
51 REAR OPTICAL BASE
52 FRONT OPTICAL BASE
53A, 53B, 53C SUPPORT POLES
61 BELLOWS
62 RESILIENT MEMBER
71 STRUCTURAL MEMBER

The invention claimed is:

1. A gas laser oscillator comprising an oscillator housing formed of a metallic material; a pair of optical bases arranged on two sides of the oscillator housing, connected in parallel by at least three support poles extending in an optical axis direction, and each supporting optical components that form an optical resonator; and a pair of bellows and resilient members that connect the pair of optical bases to the oscillator housing, wherein:
in a case in which an optical axis direction of the optical resonator is X-axis, a height direction perpendicular to the optical axis direction is Z-axis, and a direction perpendicular to the X-axis and the Z-axis is Y-axis,
the oscillator housing comprises:
a main body unit that is formed of a metallic material, shaped into a frame, and has a pair of side panels arranged and spaced apart in the X-axis direction and a top panel and a bottom panel that extend in the X-axis direction to connect the side panels at top ends and bottom ends thereof in the Z-axis direction; and
a cover unit that is formed of a metallic material to cover openings of the main body unit, has an arc cross section perpendicular to the X-axis, and includes an outer wall extending in the X-axis direction and side walls connected to both ends of the outer wall in the X-axis direction, and
the outer wall is configured to have an arc shape so that force is generated in the Z-axis direction toward outside of the oscillator housing on a connecting portion of the cover unit with the main body unit when the cover unit is fixed to the main body unit with a fixing member.

2. The gas laser oscillator according to claim 1, wherein;
in a case in which the outer wall having the arc shape has a curvature radius R, and a chord length H in a cross section of the cover unit perpendicular to the X-axis, the outer wall satisfies:

$R > H/2$.

3. The gas laser oscillator according to claim 2, wherein;
in a case in which the main body unit has a width W, the outer wall satisfies:

$R = H/(2 \cdot \sin(\arctan(H/W)))$.

4. The gas laser oscillator according to claim 1, further comprising;
a structural member that couples the side panels of the main body unit to each other and is not in contact with the top panel and the bottom panel,
wherein a discharge electrode arranged in the oscillator housing is fixed to the structural member to be kept from contact with the top panel, the bottom panel, and the cover unit.

5. The gas laser oscillator according to claim 4, wherein;
the structural member is a hollow square component formed of a metallic material,
the support poles includes two upper support poles arranged above the outside of the oscillator housing and a lower support pole arranged to penetrate through the main body unit near center thereof; and
the lower support pole is arranged inside the square component to penetrate through.

6. The gas laser oscillator according to claim 4, wherein a fan, a heat exchanger, and a gas duct arranged inside the oscillator housing are fixed to the structural member so as to be kept from contact with the top panel, the bottom panel, and the cover unit.

7. The gas laser oscillator according to claim 4, wherein any components fixed to the oscillator housing are fixed to the side walls and/or the structural member.

* * * * *